(12) United States Patent
Umeno

(10) Patent No.: US 11,091,002 B2
(45) Date of Patent: Aug. 17, 2021

(54) VEHICLE SPRING PRODUCTION METHOD AND VEHICLE SPRING

(71) Applicant: NHK SPRING CO., LTD., Yokohama (JP)

(72) Inventor: Jun Umeno, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 287 days.

(21) Appl. No.: 16/262,388

(22) Filed: Jan. 30, 2019

(65) Prior Publication Data

US 2019/0160906 A1     May 30, 2019

Related U.S. Application Data

(63) Continuation of application No. PCT/JP2017/023853, filed on Jun. 29, 2017.

(30) Foreign Application Priority Data

Aug. 3, 2016   (JP) ............................. JP2016-153117

(51) Int. Cl.
*B60G 21/055*   (2006.01)
*F16F 1/36*   (2006.01)

(52) U.S. Cl.
CPC ............ *B60G 21/055* (2013.01); *F16F 1/36* (2013.01); *B60G 2206/724* (2013.01); *B60G 2206/73* (2013.01); *B60G 2206/821* (2013.01)

(58) Field of Classification Search
CPC ............. B60G 21/055; B60G 21/0551; B60G 2206/73; B60G 2206/821; B60G 2206/91;
(Continued)

(56) References Cited

U.S. PATENT DOCUMENTS 4,763,882 A * 8/1988 Nishiyama ............ B60G 15/068
267/152
5,565,251 A * 10/1996 Tang ...................... B29C 48/12
428/36.8

(Continued)

FOREIGN PATENT DOCUMENTS

CA        2943644 A1    10/2015
CN      106104062 A     11/2016
(Continued)

OTHER PUBLICATIONS

International Search Report (ISR) dated Aug. 8, 2017 issued in International Application No. PCT/JP2017/023853.
(Continued)

*Primary Examiner* — Vishal R Sahni
(74) *Attorney, Agent, or Firm* — Holtz, Holtz & Volek PC

(57) ABSTRACT

A stabilizer includes a stabilizer bar and a rubber bush. The stabilizer bar includes a bar body made of a steel and a coating film covering the bar body. The coating film is formed on the surface of the bar body by using a resin having a water contact angle of more than 65°. By performing surface treatment for reducing the contact angle of the coating film present on an attachment part, the contact angle of the attachment part is changed to 65° or less. A pre-cured liquid adhesive agent is applied to an inner surface (adhesion surface) of the rubber bush. After a region including the attachment part of the stabilizer bar is heated, the rubber bush is overlaid on the attachment part. The adhesive agent is cured in a state where the rubber bush is pressed.

8 Claims, 8 Drawing Sheets

(58) Field of Classification Search
CPC .......... B60G 2206/72; B60G 2206/724; B60G 2206/8403; B60G 2206/427; B60G 2206/135
See application file for complete search history.

(56) References Cited

U.S. PATENT DOCUMENTS

| | | | | |
|---|---|---|---|---|
| 8,382,129 | B2* | 2/2013 | Sugiura | F16F 1/16 280/124.107 |
| 8,613,460 | B2* | 12/2013 | Suwa | C08G 59/42 280/124.107 |
| 10,052,929 | B2* | 8/2018 | Kuroda | B60G 21/055 |
| 10,232,678 | B2* | 3/2019 | Kuroda | F16F 15/08 |
| 2011/0170814 | A1* | 7/2011 | Nakamura | F16F 1/3605 384/125 |
| 2015/0251514 | A1* | 9/2015 | Yamamotoya | B60G 15/062 267/221 |
| 2017/0015171 | A1 | 1/2017 | Enomoto et al. | |
| 2017/0174030 | A1 | 6/2017 | Mori et al. | |
| 2018/0141402 | A1* | 5/2018 | Oh | B60G 21/0551 |
| 2018/0244125 | A1* | 8/2018 | Lechner | C21D 9/02 |

FOREIGN PATENT DOCUMENTS

| | | | |
|---|---|---|---|
| EP | 3124821 | A1 | 2/2017 |
| EP | 3187747 | A1 | 7/2017 |
| JP | H01175906 | U | 12/1989 |
| JP | 2002264625 | A | 9/2002 |
| JP | 2006096116 | A | 4/2006 |
| JP | 2010228020 | A | 10/2010 |
| JP | 2014-101903 | * | 6/2014 |
| JP | 2015190538 | A | 11/2015 |
| JP | 2016049965 | A | 4/2016 |
| MX | 2016012576 | A | 4/2017 |

OTHER PUBLICATIONS

Written Opinion dated Aug. 8, 2017 issued in International Application No. PCT/JP2017/023853.

* cited by examiner

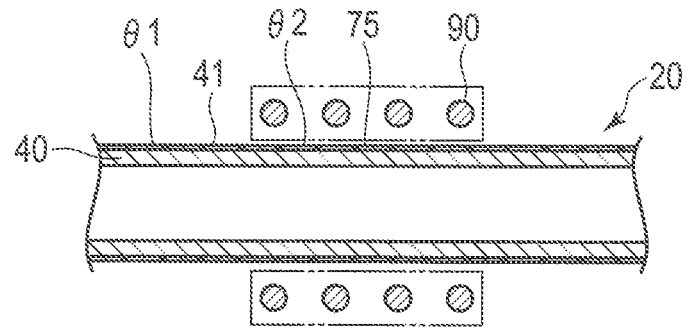
F I G. 10
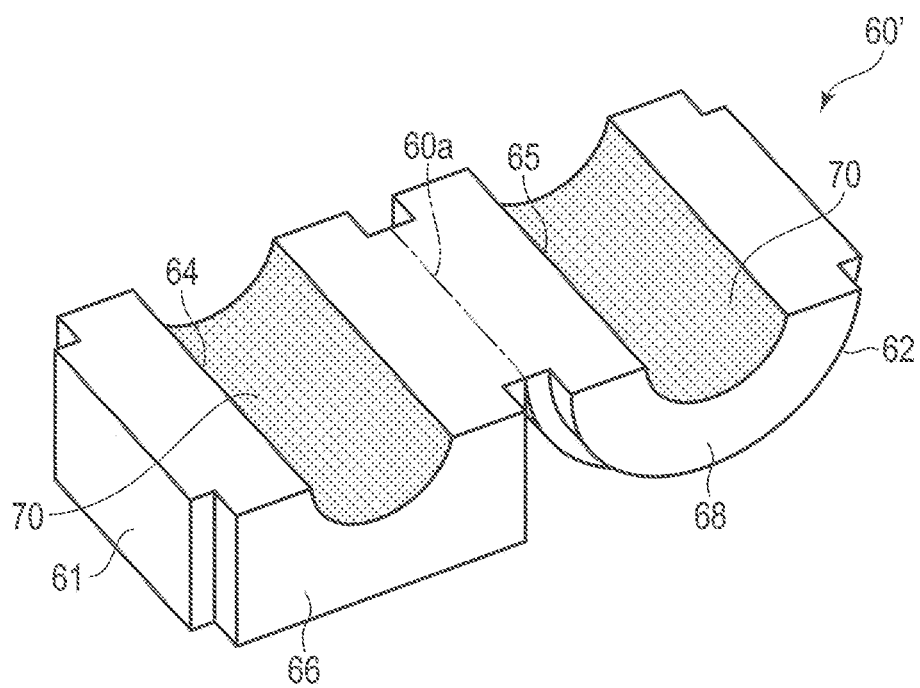
F I G. 11

VEHICLE SPRING PRODUCTION METHOD AND VEHICLE SPRING

CROSS-REFERENCE TO RELATED APPLICATIONS

This application is a Continuation Application of PCT Application No. PCT/JP2017/023853, filed Jun. 29, 2017 and based upon and claiming the benefit of priority from prior Japanese Patent Application No. 2016-153117, filed Aug. 3, 2016, the entire contents of all of which are incorporated herein by reference.

BACKGROUND OF THE INVENTION

1. Field of the Invention

The present invention described herein relates generally to a method of manufacturing a vehicle spring such as a stabilizer or a coil spring disposed in a suspension mechanism unit of a vehicle, and a vehicle spring.

2. Description of the Related Art

As described in, for example, Patent Literature 1 (JP H01-175906 U) or Patent Literature 2 (JP 2002-264625 A), a stabilizer bar disposed in a suspension mechanism unit of a vehicle includes a torsion portion extending in the width direction of the vehicle, a pair of arm portions (arms) continuous with both ends of the torsion portion via a bent portion, and an eye portion formed at the tip of each arm portion. The stabilizer bar includes a bar body formed of a steel material and a coating film covering the bar body.

The torsion portion of the stabilizer bar is supported by the vehicle body via a rubber bush. The eye portion is connected to a suspension arm or the like via a connecting member such as a stabilizer link. In this type of stabilizer bar, the arm portion, a bent portion, and the torsion portion function as springs against the rolling behavior of the vehicle body, and the roll stiffness of the vehicle can be thereby enhanced.

As the type of the stabilizer, a type (bushing adhesion type) in which the rubber bush is bonded to the stabilizer bar and a type (bush non-adhesion type) in which the rubber bush is not bonded to the stabilizer bar are known. In the bushing adhesion type, when the stabilizer bar is twisted the rubber bush is also twisted and elastically deformed. In the stabilizer bar of the bush adhesion type, if the adhesive surface between the rubber bush and the stabilizer bar is peeled for some reason, the predetermined performance of the stabilizer bar can not be exhibited, or the rubber bush and the stabilizer bar rub against each other an unusual sound is generated. In addition, if peeling occurs in the vicinity of the end face of the rubber bush, peeling is enlarged or the coating film is scratched, which causes rust, when hard particles or corrosive liquid intrudes from the peeled part.

In a case where the stabilizer bar and the rubber bush are bonded to each other with sufficient strength, the adhesive surface does not peel off and the rubber bush itself breaks when the peeling test is carried out. In an example of the conventional bonding method, a primer is provided between the stabilizer bar and the rubber bush to increase the adhesive strength (peel strength). However, part of the adhesive surface often peels off depending on the condition of the adhesive surface between the coating film formed of resin and the primer. In another example of the conventional bonding method, the rubber bush is bonded to the coating film only with the adhesive without using the primer. However, if the primer is not used the adhesive surface may be easily peeled off.

Thus, the surface roughness is made large and the adhesive can hardly be peeled off by roughening the adhesive surface of the coat in film with an abrasive member such as sandpaper or forming a large number of minute recesses (scratches) on the adhesive surface by irradiating the surface of the coating film with a laser beam. However, if such recesses are formed a portion where the thickness of the paint film is locally small is generated. In an extreme case, a portion where no coating film is present is formed, and the surface of the steel material is exposed, which causes rust.

BRIEF SUMMARY OF THE INVENTION

Therefore, one of embodiments described herein aims to provide a method for manufacturing a vehicle spring capable of firmly adhering a rubber member such as a rubber bush to an attachment portion of a bar member such as a stabilizer bar, and the vehicle spring.

One of the embodiments is a method for manufacturing a vehicle spring provided with a bar member and a rubber member provided at an attachment part of the bar member, and the method comprises forming a coating film of resin in which a contact angle with water exceeds 65° on a surface of a bar body formed of a steel material, changing the contact angle of a bonding surface of the attachment part to 65° or less by surface treatment for making the contact angle of the coating film small, applying an uncured liquid adhesive to the rubber member or the attachment part of the bar member, and curing the adhesive in a state where a bonded surface of the rubber member is made to overlap the attachment part and the rubber member is pressed to the attachment part.

According to the present invention, damage on the coating film which has been considered as a problem in a case of roughening the adhesive surface of the coating film by an abrasive member such as sandpaper or forming a large number of recesses on the coating film by irradiation with a laser beam can be avoided. For this reason, the rubber member can be firmly bonded to the bar member in a state where the coating film of a predetermined thickness is secured. Moreover, since the contact angle of the exposed surface (first portion) of the coating film exposed to the external environment such as rainwater has water repellency exceeding 65°, a vehicle spring member having excellent water resistance can be provided.

In the manufacturing method of the present embodiment, the adhesive may be applied to the bonded surface of the rubber member (the adhesive is not applied to the bar member) in the step of applying the adhesive. Then, after heating the region including the attachment part of the bar member by, for example, high-frequency induction heating, the adhesive may be cured by the heat of the bar member in a state where the bonded surface of the rubber member is made to overlap the attachment part.

Alternatively, the adhesive may be applied to the attachment part of the bar member (the adhesive is not applied to the rubber member) in the step of applying the adhesive. The bar member may be heated in a state in which the bonded surface of the rubber member is made to overlap the attachment part of the bar member, and the adhesive may be cured by heat transferred to the attachment part in a state in which the rubber member is pressed to the attachment part.

The material of the rubber member may be a natural rubber or a rubber selected from synthetic rubbers such as butadiene rubber, styrene butadiene rubber, isoprene rubber, chloroprene rubber, nitrile rubber, and urethane rubber, or synthetic resin having an elastic property such as urethane elastomer.

A vehicle spring according to one embodiment is provided with a bar member including a bar body formed of a steel material and a coating film covering the bar body, and a rubber member provided at an attachment part of a longitudinal part of the bar member, and the vehicle spring comprises a first portion where a contact angle with water exceeds 65° in a region excluding the attachment part of the surface of the coating film, a second portion present on the adhesive surface of the attachment part on a part of the surface of the coating film and including minute uneven portions where a maximum height and a wavelength are smaller as compared with uneven portions of the surface roughness curve of the first portion, and an adhesive provided between the adhesive surface of the attachment part and the bonded surface of the rubber member.

In a preferred example of the present embodiment, the surface of the bar body has a rough surface composed of shot peening indentations, the rough surface is covered with the coating film, and the maximum height of the surface roughness curve of the second portion is smaller than the thickness of the coating film. In addition, the maximum height of the surface roughness curve of the second portion is smaller than the maximum height of the surface roughness curve of the first portion.

An example of the bar member is a stabilizer bar arranged in a suspension mechanism unit of the vehicle, and an example of the rubber member is a rubber bush attached to the stabilizer bar. In addition, an example of the bar member may be a suspension coil spring element (wire) of a vehicle, and an example of the rubber member may be an insulator member attached to the end turn portion of the suspension coil spring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a cross-sectional view schematically showing an example of a heating device for heating the stabilizer bar.

FIG. 11 is a perspective view showing a rubber bush according to a second embodiment.

DETAILED DESCRIPTION OF THE INVENTION

A stabilizer according to the first embodiment and a bonding method of a rubber bush of the stabilizer will be described below with reference to FIG. 1 to FIG. 10. The stabilizer is an example of a vehicle spring. The rubber bush is an example of a rubber member.

Figure 1:
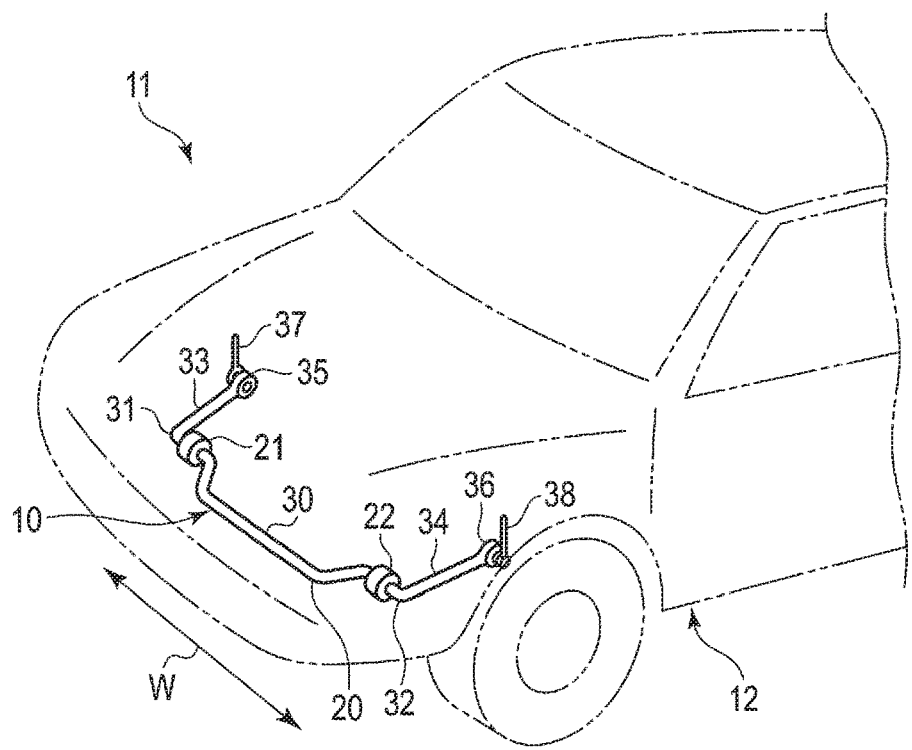
FIG. 1 is a perspective view schematically showing a part of a vehicle and a stabilizer.

FIG. 1 shows a part of a vehicle 11 provided with a stabilizer 10. The stabilizer 10 is disposed in a suspension mechanism unit of the vehicle 11. The stabilizer 10 comprises a stabilizer bar 20 extending in the width direction (the direction indicated by the arrow W) of a vehicle body 12 of the vehicle 11, and a pair of bush units 21 and 22 provided on the stabilizer bar 20. The stabilizer bar 20 is an example of a bar member.

The stabilizer bar 20 includes a torsion portion 30 extending along the width direction (the direction indicated by the arrow W) of the vehicle body 12 and arm portions 33 and 34 continuous with both ends of the torsion portion 30 via bent portions 31 and 32. Eye portions 35 and 36 are formed at distal ends of the arm portions 33 and 34, respectively. The eye portions 35 and 36 are connected to, for example, a suspension arm of the suspension mechanism unit via connection members 37 and 38 such as a stabilizer link.

The torsion portion 30 of the stabilizer bar 20 is supported by, for example, a part (cross member or the like) of the vehicle body 12 via the bush units 21 and 22. If forces of opposite phases are input to the arm portions 33 and 34 when the vehicle 11 travels on a curve, bending and twisting forces are applied to the bent portions 31 and 32. Then, the torsion portion 30 is twisted to generate a repulsive load, and the rolling behavior of the vehicle body 12 is thereby suppressed.

Figure 2:
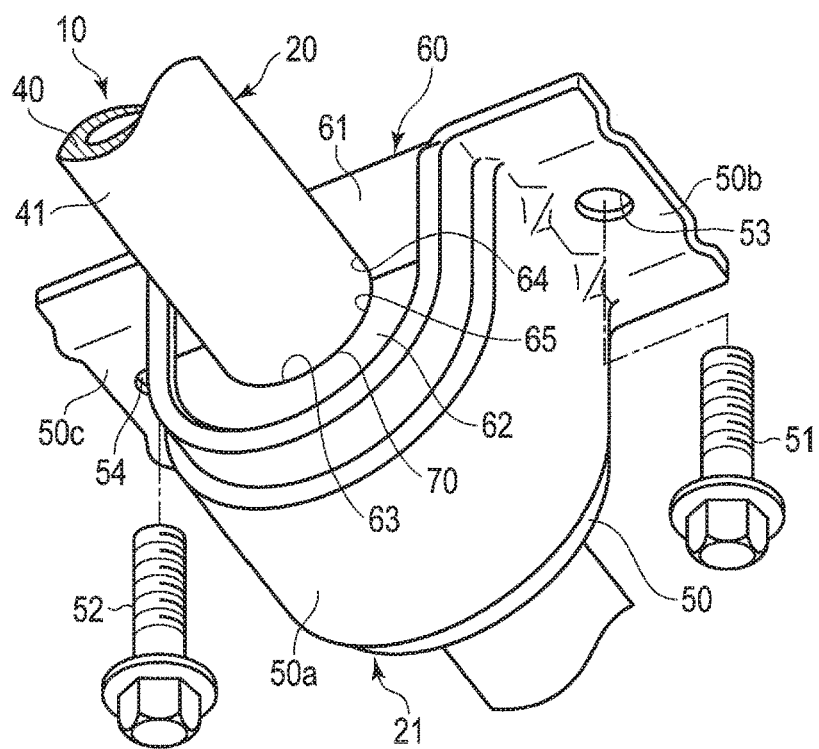
FIG. 2 is a perspective view showing a part of the stabilizer according to the first embodiment.
Figure 3:
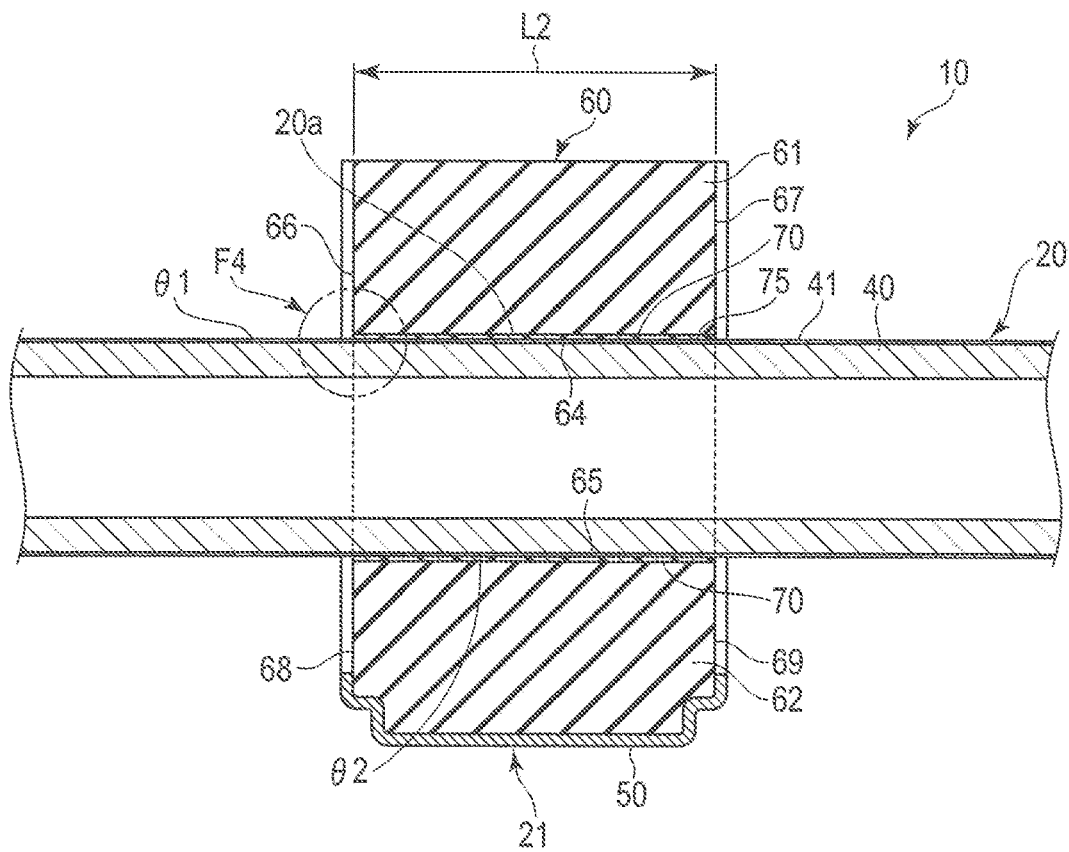
FIG. 3 is a cross-sectional view taken along the axial direction of a part of the stabilizer.
Figure 4:
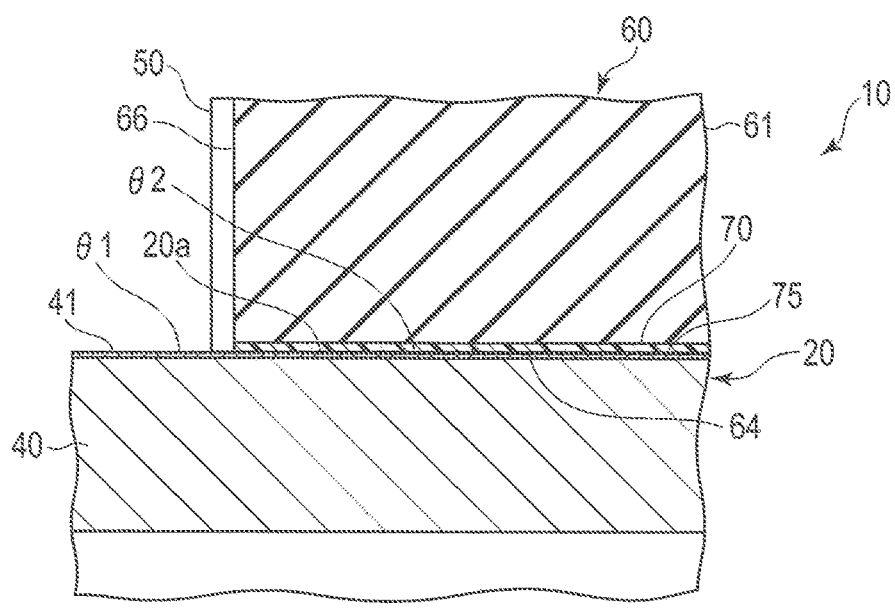
FIG. 4 is an enlarged cross-sectional view showing a part of the stabilizer.

FIG. 2 shows a part of the stabilizer bar 20 and the bush unit 21. FIG. 3 is a cross-sectional view taken along an axial direction of a part of the stabilizer bar 20 and the bush unit 21. The bush unit 21 is fixed to an attachment part 20a which is a longitudinal part of the stabilizer bar 20. FIG. 4 is an enlarged cross-sectional view showing the portion indicated by F4 in FIG. 3.

The stabilizer bar 20 includes a bar body 40 formed of a steel material such as spring steel and a coating film 41 covering the surface of the bar body 40. The coating film 41 is formed of, for example, an epoxy-based paint colored for a main purpose of corrosion resistance in consideration of appearance quality, and is also formed on the surface of the bar body 40 by powder electrostatic coating or cationic coating to have a thickness of 10 to 150 μm. The thickness of the coating film 41 may be 150 to 500 µm as needed. The material of the coating film 41 may be polyester, a mixed resin of epoxy and polyester, polyethylene or the like in addition to the epoxy resin. The contact angle of water to the coating film 41 exceeds 65°.

The material of the bar body 40 of the present embodiment is a hollow steel material (steel pipe), and is formed in a predetermined shape by being bent by a bending machine. An example of a steel material is a steel type capable of improving strength by heat treatment such as quenching. The eye portions 35 and 36 are formed by pressing both ends of the steel material by plastic working such as forging. A material obtained by joining a hollow steel material and a solid steel material may be used as the material of the bar body 40.

The stabilizer bar 20 is not limited to a planar shape, and may have one or more bent portions in the torsion portion 30 or one or more bent portions in the arm portions 33 and 34, including a three-dimensional bent shape. In addition, the bent portions 31 and 32 may have a three-dimensional bent shape. In a solid stabilizer, a bar body formed of a solid steel material serving as a material is used.

Since the pair of bush units 21 and 22 have a common structure, the bush unit 21 will be described below as a representative. The bush unit 21 comprises a metallic bracket 50 and a rubber bush 60 disposed inside the bracket 50. A hole 63 through which the stabilizer bar 20 passes is formed in the rubber bush 60.

The bracket 50 has a substantially U-shaped cover portion 50a shaped to hold the rubber bush 60 and a pair of arm portions 50b and 50c formed on both sides of the cover portion 50a. Holes 53 and 54 for insertion of bolts 51 and 52 are formed in the arm portions 50b and 50c, respectively. The bush unit 22 is attached to the suspension mechanism unit from the lower side or the upper side of the vehicle by the bolts 51 and 52.

Figure 5:
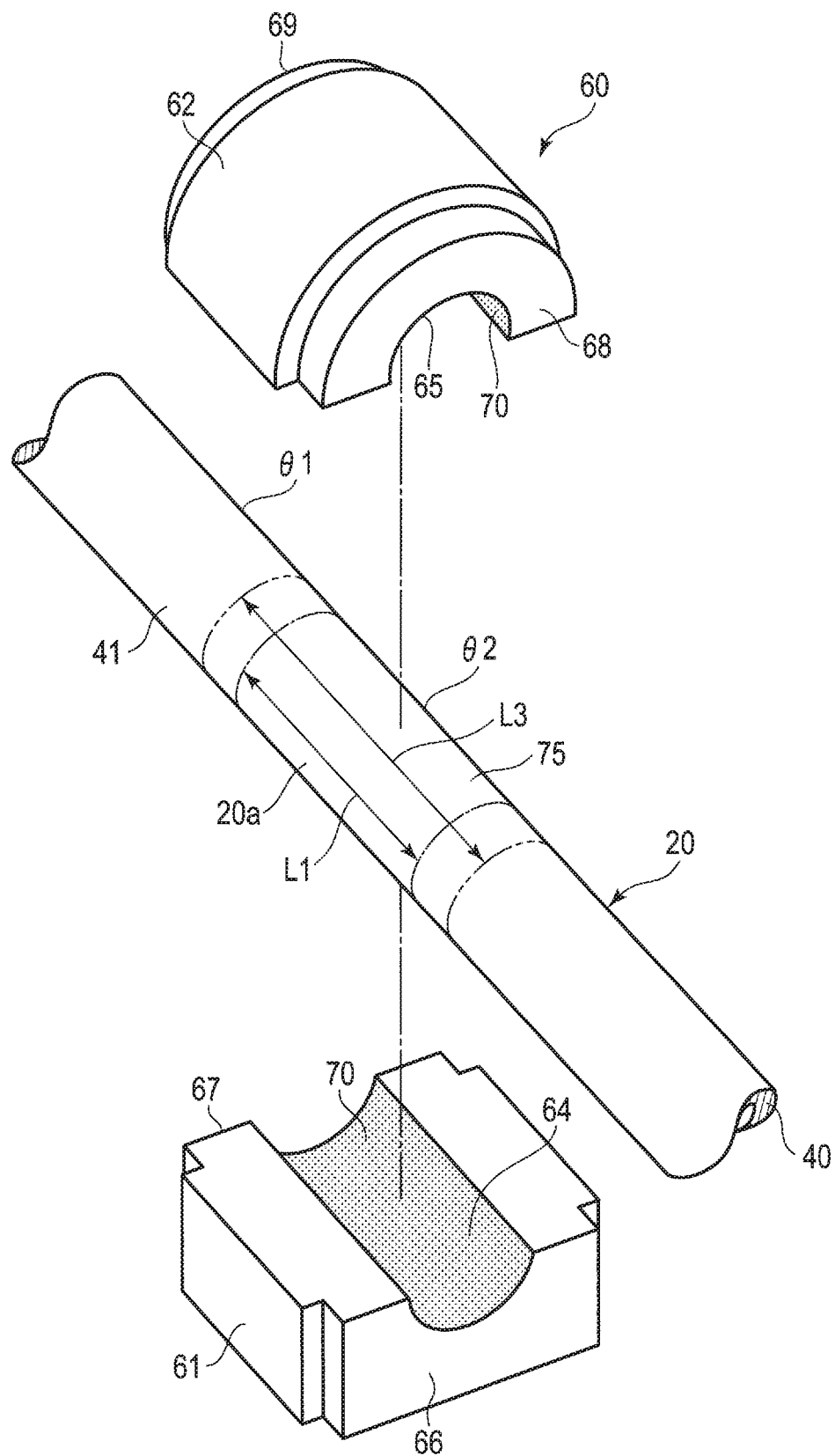
FIG. 5 is a perspective view showing a state obtained before the rubber bush of the stabilizer is attached to the stabilizer bar.

FIG. 5 shows a two-piece rubber bush 60. The rubber bush 60 is composed of a pair of first bush piece 61 and second bush piece 62. Inner surfaces 64 and 65 having curvature radii corresponding to the outer diameter of the torsion portion 30 of the stabilizer bar 20 are formed on the mutually opposed surfaces of the first bush piece 61 and the second bush piece 62, respectively. The inner surfaces 64 and 65 are also surfaces to be bonded to the stabilizer bar 20.

The first bush piece 61 has a pair of end faces 66 and 67. The second bush piece 62 also has a pair of end faces 68 and 69. The first bush piece 61 and the second bush piece 62 are formed of a material having rubber elasticity, for example, kneading rubber of NR and IIR (blend rubber of natural rubber and synthetic rubber such as butyl rubber). The number of divisions of the rubber bush 60 may be other than two. In addition, an iron plate or a core material formed of synthetic resin may be inserted to adjust the rigidity and the like inside the rubber bush 60.

An adhesive 70 is provided between the stabilizer bar 20 and the inner surfaces (bonded surfaces) 64 and 65 of the bush pieces 61 and 62. The thickness of the adhesive 70 is 10 to 70 µm. The adhesive 70 is formed of a polyolefin resin and a solvent and is cured by heating at a temperature of, for example, 140 to 170° C. The adhesive 70 may be a vulcanization adhesive or, for example, an acrylic structural adhesive. If the thickness of the adhesive 70 is smaller than the above range, adhesion failure is likely to occur. Conversely, if the thickness of the adhesive 70 is larger than the above range, the process time required for bonding becomes long and the amount of use of the adhesive 70 increases.

As shown in FIG. 2, the bush pieces 61 and 62 are fixed to the stabilizer bar 20 via the adhesive 70 in a state where the stabilizer bar 20 is sandwiched between the inner surface 64 of the first bush piece 61 and the inner surface 65 of the second bush piece 62. The first bush piece 61 and the second bush piece 62 are covered with the cover portion 50a of the bracket 50.

As shown in FIG. 5, the first bush piece 61 and the second bush piece 62 are fixed to the attachment part 20a which is a longitudinal part of the stabilizer bar 20 with an adhesive 70. Length L1 of the attachment part 20a is equal to length L2 (shown in FIG. 3) of the rubber bush 60. The surface of the stabilizer bar 20 is covered with the coating film 41 over the entire region in the longitudinal direction including the attachment part 20a.

Figure 6:
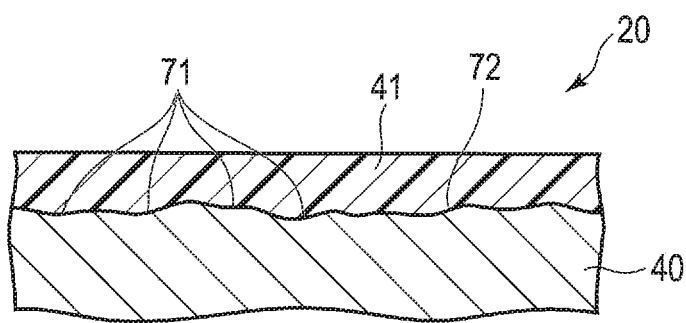
FIG. 6 is an enlarged cross-sectional view showing a stabilizer bar of the stabilizer and a part of the coating film.

FIG. 6 is an enlarged cross-sectional view showing a part of the bar body 40 and a part of the coating film 41. The coating film 41 contains conversion coating such as zinc phosphate coating. A rough surface 72 composed of a large number of shot peening indentations 71 is formed on the surface of the bar body 40. This rough surface 72 is covered with the coating film 41. The shot peening indentation 71 are formed by hitting a large number of shot particles on the surface of the bar body 40 by a shot peening machine. Compressive residual stress is imparted to the surface of the bar body 40 to a depth of, for example, approximately 0.1 to 0.3 mm, by shot peening. For the surface roughness of the rough surface 72, the maximum height of the surface roughness curve is, for example, 100 µm or less. The surface roughness and the depth of the compressive residual stress may be varied in the longitudinal direction of the bar body 40 as needed. Since the rough surface 72 is formed on the surface of the bar body 40, the coating film 41 can be firmly fixed to the bar body 40.

A first example of a process of bonding the rubber bush 60 to the stabilizer bar 20 will be described below with reference to FIG. 7 to FIG. 10. A coating film 41 is formed on the surface of the stabilizer bar 20 by a coating process (powder electrostatic coating or cationic coating) performed in advance. The material of the coating film 41 is, for example, an epoxy resin. The powder coating material adhering to the surface of the bar body 40 during the powder electrostatic coating is heated in a heating furnace and fixed on the surface of the bar body 40, and the coating film 41 is thereby formed. The contact angle of the coating film 41 exceeds 65°.

Figure 7:
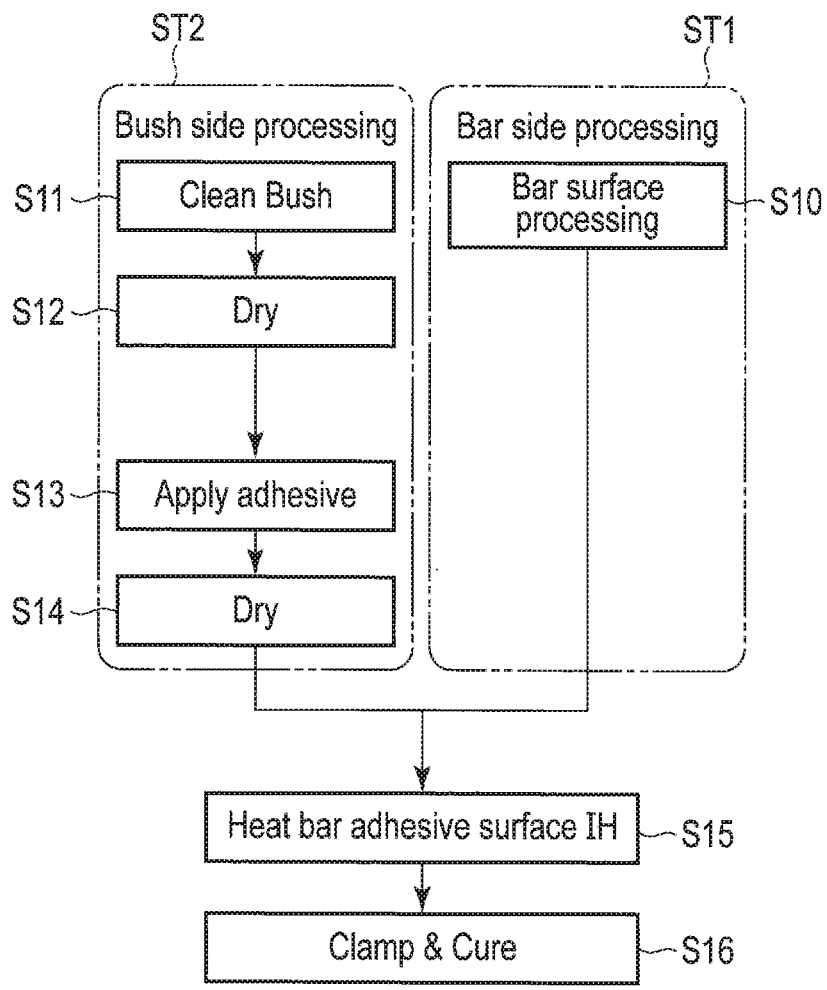
FIG. 7 is a diagram showing a first example of a process of bonding the rubber bush of the stabilizer to the stabilizer bar.

Bar side processing ST1 is shown on the right side in FIG. 7, and bush side processing ST2 on the left side. In the bar side processing ST1, a surface treatment S10 for lowering the contact angle of the coating film 41 existing in the attachment part 20a of the stabilizer bar 20 is performed. The surface treatment S10 is performed on the surface of the coating film 41 of the attachment part 20a, that is, the region L3 (shown in FIG. 5) including an adhesive surface 75.

Figure 8:
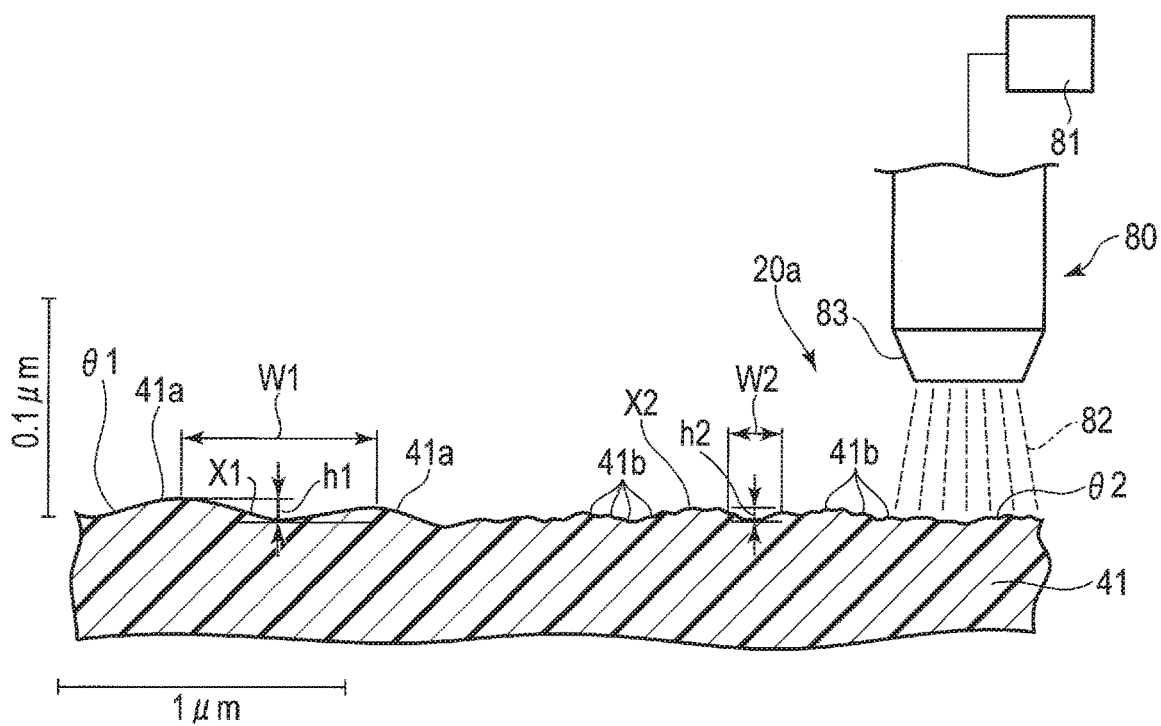
FIG. 8 is a view schematically showing the surface roughness curve of the coating film and the plasma processing device.

The surface treatment S10 for lowering the contact angle is performed using, for example, a plasma processing device 80 schematically shown in FIG. 8. The plasma processing device 80 ejects plasma 82 generated by a plasma generator 81 from a nozzle 83 toward the coating film 41 of the attachment part 20a. When the surface of the coating film 41 is observed with an atomic force microscope (AFM), the surface to be subjected to the plasma processing has uneven portions 41a, which are "undulation" in which a wavelength w1 and a maximum height h1 are relatively large as represented by surface roughness curve X1 on the left side in FIG. 8.

On the other hand, a large number of minute uneven portions 41b are generated as represented by surface roughness curve X2 on the right side in FIG. 8, on the surface of the coating film 41 subjected to the plasma processing. These minute uneven portions 41b are larger in number per unit area than the smooth uneven portions 41a such as "undulation" to be subjected to the plasma processing, and the wavelengths w2 and the maximum height h2 become smaller. Since a large number of minute uneven portions 41b are present on the surface of the activated coating film 41, the contact angle is made smaller and the wettability of the adhesive 70 on the coating film 41 can be improved.

Figure 9:
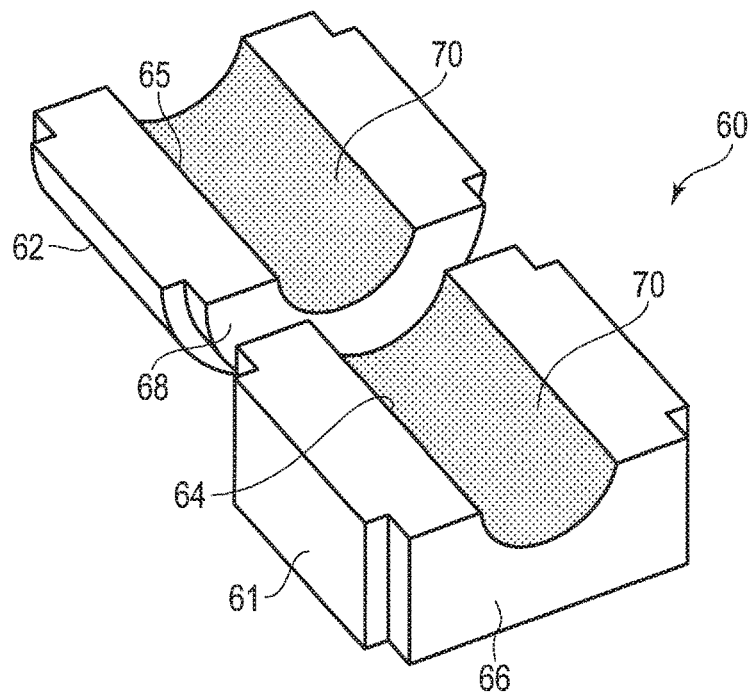
FIG. 9 is a perspective view showing a state in which a first bush piece and a second bush piece of the rubber bush shown in FIG. 5 are arranged side by side.

In the bush side processing ST2 in FIG. 7, the inner surfaces (bonded surfaces) 64 and 65 of the rubber bush 60 are cleaned with a volatile solvent such as thinner or an alkaline cleaning liquid in a cleaning step S11. In a first drying step S12, the rubber bush 60 is dried to volatilize the solvent or the cleaning liquid. In an adhesive application step S13, the inner surfaces 64 and 65 of the first bush piece 61 and the second bush piece 62 are arranged to face upward, and the adhesive 70 is applied to each of the inner surfaces (bonded surfaces) 64 and 65 as shown in FIG. 9. More specifically, the pre-cured liquid adhesive 70 is applied to the inner surfaces 64 and 65 of the first bush piece 61 and the second bush piece 62 by a coating means such as a spray gun. In a second drying step S14, the solvent in the adhesive 70 is volatilized and the adhesive 70 is cured to some extent.

In the heating step S15 in FIG. 7, the stabilizer bar 20 is heated. At that time, the stabilizer bar 20 is heated around the region including an adhesive surface 75. For example, the region including the adhesive surface 75 is heated to a predetermined temperature (for example, 200 to 250° C. or lower) by a high-frequency induction heating coil 90 shown in FIG. 10. The high-frequency induction heating coil 90 is an example of the heating device. This heating step S15 is performed before covering the rubber bush 60 on the stabilizer bar 20. Then, the inner surfaces (bonded surfaces) 64 and 65 of the bush pieces 61 and 62 are made to overlap the adhesive surface 75 of the stabilizer bar 20 before the temperature of the region including the adhesive surface 75 falls to the curing temperature (for example, 110 to 170° C.) of the adhesive 70. Then, the bush pieces 61 and 62 are clamped from both sides and pressed.

In the curing step S16 in FIG. 7, the adhesive 70 is cured in a state where the first bush piece 61 and the second bush piece 62 are clamped. In the present embodiment, the adhesive 70 is heated to the curing temperature (for example, 110 to 170° C.) by the heat of the stabilizer bar 20, and the adhesive 70 is cured by vaporizing the solvent or the like. Thus, the adhesive 70 is cured and bonded to the first bush piece 61, the second bush piece 62, and the adhesive surface 75 of the stabilizer bar 20. In this curing step S16, adhesion failure may occur if the heating temperature of the adhesive 70 is lower than the above range. Conversely, if the heating temperature is higher than the above range, the coating film 41 may be deteriorated and the durability may be lowered and the compressive residual stress applied to the surface layer portion of the stabilizer bar 20 by shot peening cannot be maintained.

In the present embodiment, a part of the adhesive surface 75 in the longitudinal direction of the stabilizer bar 20 can be directly heated by the high-frequency induction heating coil 90 before the bush pieces 61 and 62 are made to overlap the adhesive surface 75 of the stabilizer bar 20. For this reason, the heating time is shorter and temperature control of the adhesive surface is easier as compared with the conventional case where the rubber bush is made to overlap the stabilizer and the adhesive surface is indirectly heated by the high-frequency induction heating coil disposed on both sides of the rubber bush.

As described above, the method of manufacturing the stabilizer 10 according to the present embodiment includes the following steps.
(1) forming a coating film 41 of a resin having a contact angle with water of more than 65° on the surface of a bar body 40 formed of a steel material,
(2) varying the contact angle of the coating film 41 on the attachment part 20a to be 65° or less by the surface treatment S10 which makes the contact angle of the coating film 41 smaller,
(3) applying the uncured liquid adhesive 70 to the attachment portion 20a of the stabilizer bar 20 or the inner surfaces (bonded surfaces) 64 and 65 of the rubber bush 60,
(4) making the inner surfaces (bonded surfaces) 64 and 65 of the rubber bush 60 overlap the attachment part 20a of the stabilizer bar 20, and
(5) curing the adhesive 70 by heating in a state where the rubber bush 60 is pressed to the attachment part 20a of the stabilizer bar 20.

As a result of extensive research by the present inventors, when the rubber bush was directly bonded to an adhesive surface having a contact angle exceeding 65° without using a primer, the peel strength of the adhesive surface was small and did not reach a practical level. However, when the contact angle was 65° or less, the peel strength was remarkably improved and the finding was obtained that the peel strength became a peel strength at practical level. Particularly, when the contact angle was 50° or less, the ratio of the area of peeling on the adhesion surface was substantially zero and all the specimens were broken with the rubber bush itself.

Thus, the stabilizer bar 20 of the present embodiment includes a first portion (unprocessed surface) θ1 where a contact angle of the entire surface of the coating film 41 exceeds 65° and a second portion (processed surface) θ2 where a contact angle of the entire surface of the coating film 41 is 65° or less. The first portion θ1 is a region excluding the attachment part 20a and has first surface roughness. On the other hand, the second portion θ2 is a region including the attachment part 20a and has second surface roughness. The second portion θ2 includes minute uneven portions 41b where the maximum height of the surface roughness curve and the wavelength are small as compared with the uneven portions 41a of the first surface roughness. When plasma processing is performed on the second portion θ2, the second portion θ2 is affected by heat. For this reason, the surface roughness of the first portion (unprocessed surface) θ1 and the surface roughness of the second portion (processed surface) θ2 may be different from each other.

Conventionally, the surface of the coating film has been roughened by an abrasive member such as sandpaper or a large number of minute recesses (scratches) have been formed on the coating film by irradiation with a laser beam. However, maximum height Rz of the surface roughness curve of the adhesive surface on which such recesses are formed has been as large as 42 μm. For this reason, if the thickness of the coating film 41 is 10 to 150 μm, the coating film does not exist on some parts of the surface of the stabilizer bar, and the metal surface may be exposed at the parts. In contrast, the maximum height Rz of the surface roughness curve is as small as 7 μm, on the coating film 41 of the second portion θ2 subjected to the surface treatment S10 of the present embodiment. For this reason, exposing the metal surface of the bar body 40 can be avoided at the portions where the thickness of the coating film 41 is the smallest (for example, the thickness of the coating film 41 is 10 μm).

Thus, according to the rubber bush bonding method of the present embodiment, the rubber bush 60 can be firmly bonded to the attachment part 20a of the stabilizer bar 20. Furthermore, since the coating film 41 of the first portion θ1 exposed to the external environment such as rainwater has water repellency with a contact angle exceeding 65°, the stabilizer bar 20 having excellent water resistance can be provided.

In addition, the coating film 41 of the stabilizer bar 20 of the present embodiment has the second portion θ2 of the second surface roughness composed of a large number of minute uneven portions 41b on the surface of the attachment part 20a. If the stabilizer bar 20 is twisted while the vehicle is traveling, a force in the torsional direction acts on the rubber bush 60, and the rubber bush 60 is elastically deformed. For such a force in the torsional direction, a large number of minute uneven portions 41b existing on the adhesive surface 75 work effectively to maintain the adhesiveness of the bonding interface.

In addition, according to the rubber bush bonding method of the present embodiment, the adhesive 70 is applied to the bush pieces 61 and 62 before the bush pieces 61 and 62 overlap the stabilizer bar 20. For this reason, the usage amount of the adhesive 70 can be reduced as compared with the conventional method in which the adhesive is applied to the adhesive surface on the stabilizer bar 20 side. Moreover, since the adhesive agent 70 does not protrude to the outside of the bonding surface 75, the appearance of the stabilizer bar 20 can also be improved.

FIG. 11 shows a rubber bush 60' according to a second embodiment. In the rubber bush 60' of the present embodiment, a first bush piece 61 and a second bush piece 62 are connected via a hinge portion 60a. The first bush piece 61 and the second bushing piece 62 are folded with the hinge portion 60a as a boundary, and the stabilizer bar 20 is sandwiched between the inner surfaces 64 and 65. Since the rubber bush 60' of the present embodiment is similar to the rubber bush 60 of the first embodiment with respect to the other constituent elements, portions common to both the embodiments are denoted by the same reference numerals and their explanations are omitted.

Figure 12:
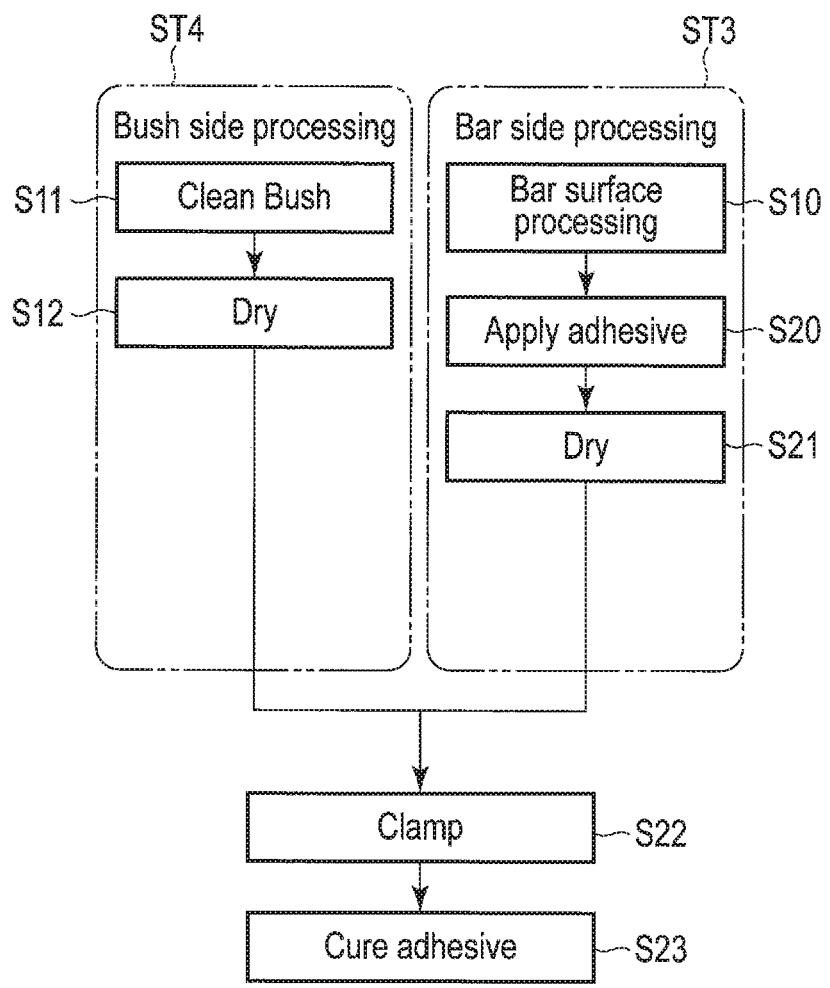
FIG. 12 is a view showing a second example of the process of attaching the rubber bush to the stabilizer bar.

FIG. 12 shows a second example of the step of bonding the rubber bush 60 to the stabilizer bar 20. In bar side processing ST3 in FIG. 12, surface treatment S10 for lowering a contact angle is performed similarly to the bar side processing ST1 of the first example (FIG. 7). The contact angle of the adhesive surface to be subjected to the surface treatment S10 exceeds 65°, but the contact angle is varied to 65° or less by the surface treatment S10.

In the adhesive applying step S20 in FIG. 12, a liquid adhesive 70 is applied to the adhesive surface 75 of the stabilizer bar 20. More specifically, a pre-cured liquid adhesive 70 is applied to the surface of the attachment part 20a of the stabilizer bar 20 by a coating means such as a spray gun or a brush. Then, in drying step S21, a solvent in the adhesive 70 is volatilized and the adhesive 70 is cured to some extent.

In the bush side processing ST4 in FIG. 12, the inner surfaces (bonded surfaces) 64 and 65 of the rubber bush 60 are cleaned with a volatile solvent such as thinner or an alkaline cleaning liquid, in the cleaning step S11, similarly to the bush side processing ST2 of the first example (FIG. 7). Then, in the drying step S12, the rubber bush 60 is dried and the solvent or the cleaning liquid is volatilized.

In clamping S22 in FIG. 12, the inner surfaces (bonded surfaces) 64 and 65 of the bush pieces 61 and 62 are made to overlap the adhesive surface 75 of the stabilizer bar 20. The adhesive 70 is applied to the adhesive surface 75 in advance in the adhesive applying step S20. Then, the bush pieces 61 and 62 are clamped from both sides and pressed.

In the curing step S23 in FIG. 12, the stabilizer bar 20 is heated from both sides of the attachment part 20a by a high-frequency induction heating coil arranged on both sides of the rubber bush 60. The heat is transferred to the bonding surface 75, and the adhesive 70 is thereby heated to the curing temperature (for example, 110 to 170° C.) and the adhesive 70 is cured.

Figure 13:
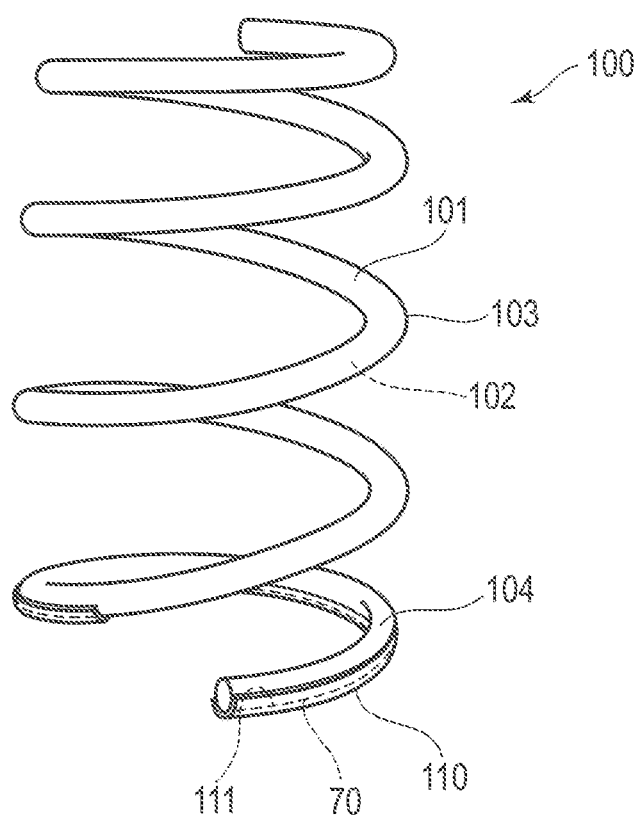
FIG. 13 is a perspective view showing a suspension coil spring according to a third embodiment.

FIG. 13 shows a suspension coil spring 100 as an example of the vehicle spring according to the third embodiment. The coil spring 100 has a wire (bar member) 101. The wire 101 includes a bar body 102 formed of spring steel and a coating film 103 covering the bar body 102. The bar body 102 is formed in a spiral shape by a coiling machine. The material of the bar body 102 may be a spring steel material suitable for hot working or cold working, or high strength steel or carburizing steel. Alternatively, low carbon steel having a carbon concentration of approximately 0.15 to 0.60 wt % can be used in some cases and, in short, various steel materials can be used. The surface of the bar body 102 is covered with the coating film 103. The coating film 103 is formed of a resin having a contact angle with water of more than 65°.

An insulator member 110 which is an example of a rubber member is provided on a lower surface of an end turn portion 104 of the coil spring 100. The insulator member 110 is fixed to an adhesive surface 111 of a wire 101 by an adhesive 70, similarly to the rubber bush 60 of the stabilizer 10 described in the first embodiment (FIG. 1 to FIG. 10). The coating film 103 existing on the adhesive surface 111 is processed such that the contact angle is 65° or less by the surface treatment S10 that reduces the contact angle that is similar to that in the first embodiment, immediately before the insulator member 110 is adhered. For this reason, the insulator member 110 can be firmly fixed to the end turn portion 104.

The material of the insulator member 110 may be a natural rubber or a rubber selected from synthetic rubber such as butadiene rubber, styrene butadiene rubber, isoprene rubber, chloroprene rubber, nitrile rubber, urethane rubber, and the like, or an elastic synthetic resin such as urethane elastomer.

The present invention can also be applied to a vehicle spring other than a stabilizer and a coil spring. In addition, the rubber member may be a rubber member in various forms including a rubber bush of a stabilizer and an insulator member of a coil spring. The number of divisions of the rubber bush (number of bush pieces) may be 2 or more (for example, three divisions). The steel material which is the material of the bar member may be a solid material other than the hollow material (steel pipe).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a vehicle spring that includes a bar member including a bar body formed of a steel material and a coating film covering the bar body, and a rubber member provided on an attachment part of the bar member, the method comprising:

forming a rough surface composed of shot peening indentations on a surface of the bar body by hitting shot particles on the surface of the bar body;

forming the coating film of a resin on the surface of the bar body, thereby covering the rough surface with the coating film, wherein the coating film has a contact angle with water that exceeds 65°;

changing the contact angle with water of the coating film at a bonding surface of the attachment part to 65° or less by plasma processing for making the contact angle with water of the coating film smaller;

applying an uncured liquid adhesive to the rubber member or the attachment part of the bar member;

heating a region including the attachment part of the bar member;

after heating the region including the attachment part, making a bonded surface of the rubber member overlap the attachment part of the bar member; and curing the adhesive in a state where the rubber member is pressed to the attachment part, thereby fixing the rubber member to the attachment part.

2. The method of claim 1, wherein the adhesive is applied to the bonded surface of the rubber member in the step of applying the adhesive.

3. The method of claim 1, wherein the adhesive is applied to the attachment part of the bar member in the step of applying the adhesive.

4. The method of claim 3, wherein the bar member is heated in a state where the bonded surface of the rubber member overlaps the attachment part of the bar member, and the adhesive is cured with heat transferred to the attachment part in a state where the rubber member is pressed to the attachment part.

5. A vehicle spring that includes a bar member including a bar body formed of a steel material and a coating film covering the bar body, and a rubber member provided on an attachment part at a part of the bar member in a longitudinal direction, the vehicle spring comprising:

a first portion, located outside of the attachment part, where a surface of the coating film has a contact angle with water exceeding 65°;

a second portion, which includes the attachment part and includes an adhesive surface where the rubber member is adhered; and an adhesive provided between the adhesive surface and a bonded surface of the rubber member, wherein a surface of the bar body includes a rough surface composed of shot peening indentations, the rough surface being fully covered with the coating film, wherein in the first portion, the coating film has first uneven portions that comprise projections of the coating film, wherein in the second portion, the coating film has second uneven portions that comprise projections of the coating film, wherein the second uneven portions are smaller than the first uneven portions, and wherein a number per unit area of the second uneven portions in the second portion is greater than a number per unit area of the first uneven portions in the first portion.

6. The vehicle spring of claim 5, wherein a maximum height of the second uneven portions in the second portion is smaller than a maximum height of the first uneven portions in the first portion.

7. The vehicle spring of claim 5, wherein the bar member is a stabilizer bar configured to be disposed in a suspension mechanism of the vehicle, and the rubber member is a rubber bush attached to the stabilizer bar.

8. The vehicle spring of claim 5, wherein the vehicle spring is a suspension coil spring, the bar member is a wire of the suspension coil spring, and the rubber member is an insulator member attached to an end turn portion of the suspension coil spring.

* * * * *